United States Patent Office 3,527,479
Patented Sept. 8, 1970

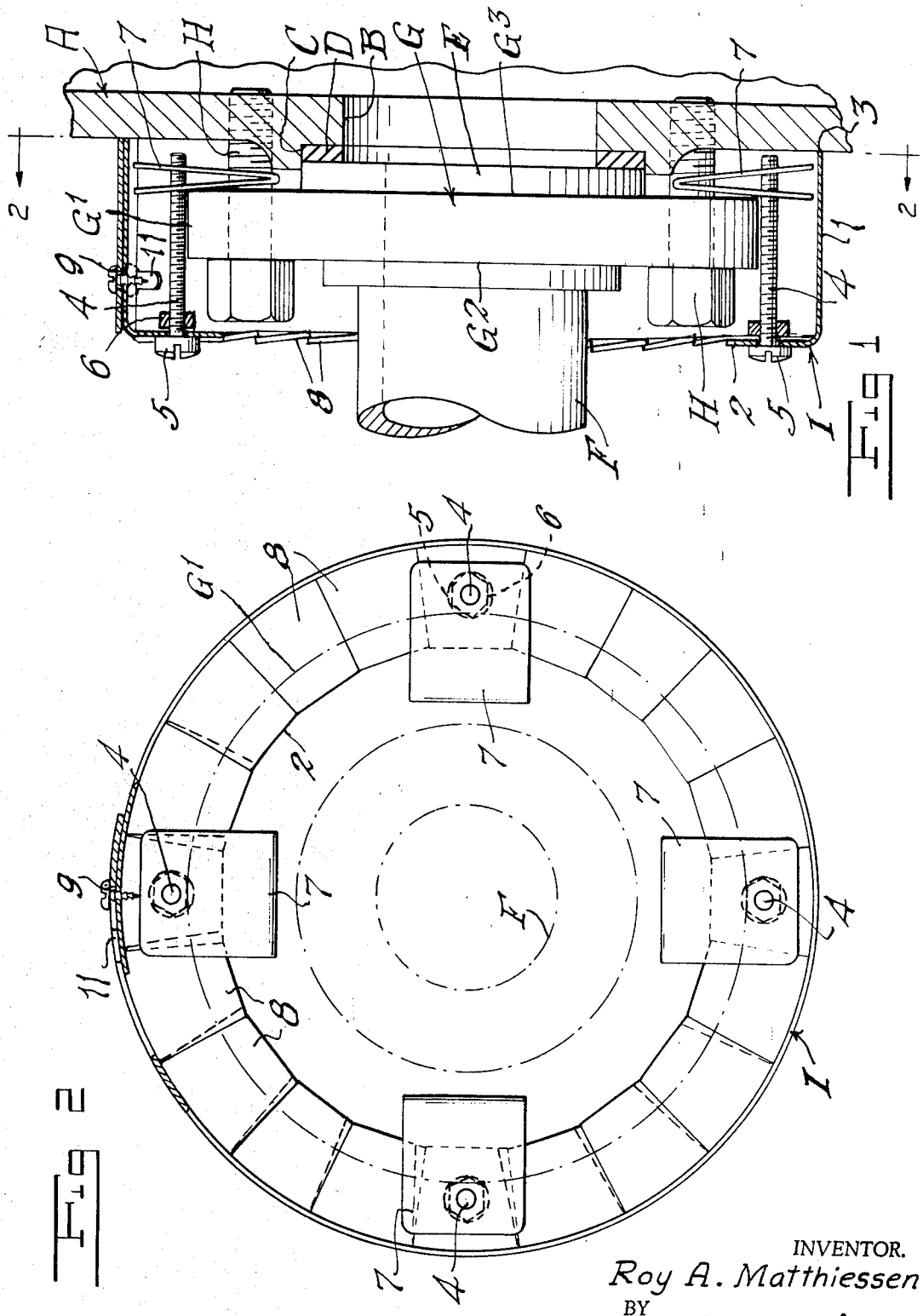

3,527,479
LEAKAGE INTERCEPTOR FOR FLANGED PIPE TO HOUSING COUPLINGS
Roy A. Matthiessen, 30 Sandy Hill Road, Westfield, N.J. 07090
Filed Apr. 3, 1969, Ser. No. 812,981
Int. Cl. F16l *11/12*
U.S. Cl. 285—45          10 Claims

ABSTRACT OF THE DISCLOSURE

The invention is a leakage interceptor for a pipe and wall joint wherein a pipe flange having a circumferential surface and side surfaces is secured to said wall with one side surface in spaced opposed relation to the wall. The leakage interceptor comprises a body of a diameter greater than said circumferential surface and having a circumferential inwardly projecting flange at one edge thereof. Means is provided for separably fastening said body on said pipe flange with said inwardly projecting flange in spaced opposed relation to the other side surface of the pipe flange and with the other edge of the body abutting said wall. Preferably said means comprises a plurality of part assemblies spaced apart circumferentially of said inwardly projecting flange and each assembly includes a part mounted on said inwardly projecting flange and movable relatively to another part for engaging the first-mentioned side surface of the pipe flange.

BACKGROUND OF THE INVENTION

Field of the invention

This invention relates especially to means for intercepting leakage of liquids under pressure that might be incidental to the blowing of a gasket in a pipe coupling, so as to prevent spraying or splashing of the liquid over workmen or objects in the vicinity of the pipe coupling.

The prior art

The most relevant prior art known to me is my own Pat. No. 3,113,790 which discloses a leakage interceptor for a pipe joint having two sections of pipe connected by coupling flanges bolted together. The construction shown in that patent cannot be used on a pipe and wall joint wherein a pipe coupling flange has a circumferential surface and side surfaces and is secured to a wall with one side surface in spaced opposed relation to said wall.

SUMMARY

A primary object of the present invention is to provide a leakage interceptor embodying novel and improved features of construction whereby it can be separably mounted on a pipe and wall joint of the type hereinabove described.

The invention contemplates a body having a diameter greater than the circumferential surface of the pipe coupling flange and having a circumferentially inwardly projecting flange at one edge thereof, and means for separably fastening said body on the pipe flange with said inwardly projecting flange of the body in spaced opposed relation to the side surface of the pipe flange adjacent the wall and with the other edge of the body abutting said wall.

More particularly, the invention provides means for separably fastening the body on the pipe flange, comprising a plurality of part assemblies spaced apart circumferentially of said inwardly projecting flange, each assembly including two relatively movable connected parts one mounted on said inwardly projecting flange of the body and the other part spaced from said inwardly projecting flange to engage the side surface of the pipe flange adjacent the wall, said parts being tightenable on the flange upon relative movement of the parts to separably connect the interceptor to the flange and to hold the interceptor in tight abutting contact with said wall.

BRIEF DESCRIPTION OF THE DRAWINGS

For a more complete understanding of the invention, reference should be had to the accompanying drawings in which FIG. 1 is a central longitudinal sectional view through a leakage interceptor embodying the invention, illustrating it mounted on a pipe and housing wall joint wherein the pipe is shown in side elevation and the wall is shown in section, and FIG. 2 is an end elevational view of the interceptor viewed from the plane of the line 2—2 of FIG. 1, with portions broken away and shown in section.

DESCRIPTION OF THE PREFERRED EMBODIMENT

For the purpose of illustration the interceptor or shield has been shown in conjunction with a known type of flanged pipe and wall coupling such as might be used in connecting a pipe to an opening in a bulkhead or in a bearing housing. As shown, the reference character A designates the housing wall which has an opening B therein and a rabbet C in which is disposed a packing ring or gasket D that forms a fluid-tight joint with a flange E on one end of a pipe F. The abutting contact between the gasket D and the end E of the pipe is maintained by a pipe coupling flange G which is secured to the wall A by cap screws or bolts H.

The leakage interceptor embodying the invention is designed to intercept any leakage of liquids under pressure, especially such leakage as might be incidental to the blowing or rupture of the gasket D. The coupling flange G has a circumferential surface $G^1$ and two side surfaces $G^2$ and $G^3$ one of which, in the present instance the side surface $G^3$ is in spaced opposed relation to the surface of the wall A.

The interceptor generally designated I comprises a body 1 whose diameter is greater than the circumferential surface $G^1$ of the pipe coupling flange and has at one edge thereof an inwardly projecting circumferential flange 2. The width of the body between the flange 2 and the opposite edge 3 is such that the edge 3 may abut the wall A and the flange 2 will be disposed outwardly of the coupling flange and the cap screws H as shown in FIG. 1.

Means is provided for separably fastening said body on the pipe flange and said means includes a plurality of parts mounted on the body in spaced relation circumferentially thereof and engageable with the side surface $G^3$ of the pipe flange. As shown, there are a plurality of part assemblies mounted on the flange 2 in spaced apart relation circumferentially of the flange. Each assembly is shown as comprising a screw 4 rotatably mounted in the flange with its head 5 abutting the outer side of the flange, the screw being held against pulling out of the flange by a suitable collar which may be in the form of a nut 6. A clip 7 has a screw-threaded connection with each screw and is spaced from the flange 2 a distance such that when the edge 3 of the body abuts the wall A, the clip will engage the side surface $G^3$ of the pipe flange as shown in FIG. 2. Preferably the clip is resilient and is shown as U-shaped with its arms threaded on the screw. To firmly secure the body on the pipe flange, the screws 4 are rotated in the direction to draw the respective clips tightly against the side of the pipe flange. Both the flange 2 and the clips are slightly resiliently yieldable so that the parts can be easily tightened upon the pipe flange with approximately uniform pressures and the edge 3 of the body can be forced into tight abutment with the wall A.

To facilitate the application of the body to the flange, preferably the body is formed of a single elongated strip of resilient sheet material of a length substantially greater than said circumferential surface of the pipe flange, said strip having a longitudinal flange at one edge thereof comprising a plurality of segments 8 each having one edge portion offset with respect to the edge portion of the next adjacent segment, providing for rolling of the strip into circular form around the pipe flange with the segments automatically overlapping, thereby to produce the inwardly projecting circumferential flange on the edge of the completed and installed body.

Suitable means is provided for separably connecting the ends of the strip to hold the shield in position on the pipe flange, and as shown, a headed stud or screw 9 is secured adjacent one end of the strip while the other end portion of the strip projects beyond the flanges as indicated at 10 and has a keyhole slot 11 to cooperate with the screw.

With this construction, it would be seen that should a leak under high pressure incur between the pipe and the wall, the abutment of the edge 3 of the body with the wall will prevent the spraying of the liquid between the body and the wall, and the liquid will strike and be intercepted by the body 1 and flange 2 of the shield and be deflected laterally either against the flange 2 or over the edge of said flange in approximately horizontal direction. The leaking stream will be broken up into a mist so as to avoid damage to an adjacent person or object, and should the leak be a slow leak, the liquid will collect in the lower portion of the shield between the flange 2 and the wall.

Many modifications and changes can be made in the construction and use of the shield within the spirit of the invention and the scope of the appended claims.

I claim:
1. The combination of a leakage interceptor with a housing wall having an opening therethrough and a pipe joined thereto in communication with said opening by a circumferential pipe flange secured to said wall and having a circumferential surface and side surfaces one of which is in spaced opposed relation to said wall, said leakage interceptor comprising a body encircling said flange in spaced relation to said circumferential surface of the flange, said body having a circumferential inwardly projecting flange at one edge thereof in spaced relation to the outer side surface of said pipe flange, and means for separably fastening said body on said pipe flange with the other edge portion of the body abutting said wall.

2. The combination as defined in claim 1 wherein said means includes a plurality of parts mounted on said body in spaced relation circumferentially thereof and engageable with the first-mentioned side surface of the pipe flange.

3. The combination as defined in claim 1 wherein the means includes at least one assembly of relatively movably connected parts one connected to said inwardly projecting flange on the body and another engaging the first-mentioned side surface of said pipe flange.

4. The combination as defined in claim 3 wherein said parts are tightenable upon said pipe flange upon relative movement of the parts and one of said parts is yieldable.

5. The combination as defined in claim 3 wherein said assembly of parts includes a screw rotatably mounted in said inwardly projecting flange on the body and a clip engageable with said pipe flange and having a screw-threaded connection with said screw.

6. The combination as defined in claim 5, wherein said parts are tightenable upon said pipe flange upon relative movement of the parts and said clip is yieldable upon tightening of the parts on the pipe flange.

7. A leakage interceptor for a pipe and wall joint wherein a pipe flange having a circumferential surface and side surfaces is secured to said wall with one side surface in spaced opposed relation to said wall, said leakage interceptor comprising a body of a diameter greater than said circumferential surface and having a circumferential inwardly projecting flange at one edge thereof, and means for separably fastening said body on said pipe flange with said inwardly projecting flange in spaced opposed relation to the other side surface of the pipe flange and with the other edge of the body abutting said wall.

8. A leakage interceptor as defined in claim 7 wherein the means comprises a plurality of part assemblies spaced apart circumferentially of said inwardly projecting flange, each assembly including two relatively movable connected parts one mounted on said inwardly projecting flange of the body and the other part spaced from said inwardly projecting flange a distance providing for engagement of the second-mentioned part with the second-mentioned side surface of the pipe flange, said parts being tightenable on said flange upon relative movement of the parts.

9. A leakage interceptor as defined in claim 8 wherein the first-mentioned part is a screw rotatably connected to said inwardly projecting flange and the other part is a clip having a screw-threaded connection with said screw.

10. A leakage interceptor as defined in claim 8 wherein said body comprises a single elongated strip of resilient sheet material of a length substantially greater than said circumferential surface of the pipe flange and having a longitudinal flange at one edge thereof comprising a plurality of segments, each having one edge portion offset with respect to the edge portion of the next adjacent segment, providing for automatic overlapping of said segments upon rolling of the strip into circular form around said pipe flange thereby to produce said inwardly projecting flange, and means for separably connecting the ends of said strip.

References Cited

UNITED STATES PATENTS

| 798,649 | 9/1905 | Willink | 285—45 X |
| 2,671,261 | 3/1954 | Mitchell | 285—189 X |
| 2,699,960 | 1/1955 | Callery et al. | 285—45 X |
| 2,736,577 | 2/1956 | Mackey | 285—158 |
| 3,113,790 | 12/1963 | Matthiessen | 285—419 X |
| 3,319,980 | 5/1967 | Demetriff et al. | 285—158 X |

DAVE W. AROLA, Primary Examiner

U.S. Cl. X.R.

285—211. 424